May 31, 1966     W. E. ABBOTT     3,253,997
NUCLEAR REACTOR AND COOLING AND
MODERATING ARRANGEMENT THEREFOR

Filed Dec. 3, 1962     2 Sheets-Sheet 1

WITNESSES:
Bernard R. Gieguer
Edward F. Possessky

INVENTOR
William E. Abbott
BY
ATTORNEY

May 31, 1966 W. E. ABBOTT 3,253,997
NUCLEAR REACTOR AND COOLING AND
MODERATING ARRANGEMENT THEREFOR
Filed Dec. 3, 1962 2 Sheets-Sheet 2

United States Patent Office 3,253,997
Patented May 31, 1966

3,253,997
NUCLEAR REACTOR AND COOLING AND MODERATING ARRANGEMENT THEREFOR
William E. Abbott, Wilkins Township, Allegheny County, Pa., assignor to Westinghouse Electric Corporation, East Pittsburgh, Pa., a corporation of Pennsylvania
Filed Dec. 3, 1962, Ser. No. 241,638
5 Claims. (Cl. 176—42)

The present invention relates to heterogeneous nuclear reactors and more particularly to moderating and cooling arrangements for such reactors.

It is customary in many applications to employ in a nuclear reactor a fluid such as water which both moderates and cools the reactor fuel core. If such a fluid is used, it is desirable that flexibility be provided in meeting preferred or optimum reactivity conditions simultaneously with preferred or optimum heat transfer or thermal and hydraulic conditions. Design flexibility of this kind is not commonly available because of the fact that obtaining a preferred set of thermal and hydraulic parameters normally is or can be incompatible with obtaining a preferred set of reactivity parameters.

Thus, where water is used as a coolant and moderator, a given core configuration may provide optimum reactivity while at the same time flow, pressure and heat transfer characteristics may be compromised from optimum values. The reverse circumstances can be equally as true. Further, because of the negative reactivity temperature coefficient of water brought about by decreasing water density, start-up reactivity may be decreased at core operating temperature by an amount much greater than safety considerations may require. The greater starting reactivity, of course, also requires a corresponding measure of reactivity control which is otherwise unnecessary. In the specific case of a boiling water reactor, where some of the coolant changes to the gaseous phase, another somewhat undesirable effect can occur; namely, if there is a call for a decrease in steam demand for decreased power output, increased fluid pressure in the reactor core follows a steam shutoff or let-up and resulting density increase in the core fluid or steam produces a positive reactivity coefficient and increased core power which is opposite to the effect desired.

Accordingly, in order to provide for design flexibility and in order to avoid or diminish some or all of the undesirable reactivity effects just outlined, the present invention comprises a nuclear reactor having a fuel core which contains a plurality of elongated elements in a lattice structure. In accordance with a given lattice pattern, some interstitially located core elements contain a relatively fixed amount of moderating material and the balance of the core elements contain fissile fuel. Even though the coolant is also a moderator, the overall arrangement can be readily adjusted to produce preferred coolant and reactivity conditions without undue neutron flux peaking since preferred total moderation can be fairly well stabilized by means of the relatively fixed and distributed (preferably uniformly but in some applications non-uniformly) moderating material. If the employed coolant is water, then the preferred total moderation can also be relatively stabilized while obtaining preferred coolant conditions by intermixing deuterium oxide (heavy water) in the coolant in various amounts.

Accordingly, it is an object of the invention to provide a novel and efficient nuclear reactor wherein thermal, hydraulic and reactivity conditions can be provided with relative flexibility.

It is another object of the invention to provide a novel and efficient nuclear reactor as characterized in the first object wherein a comparatively small amount of reactivity change occurs from start-up to operating conditions.

A further object of the invention is to provide a novel and efficient nuclear reactor as characterized in the first object wherein coolant boiling occurs and wherein the usual positive pressure coefficient of reactivity associated with a decrease in steam demand is substantially lowered.

An additional object of the invention is to provide a novel and efficient nuclear reactor as characerized in any of the foregoing objects wherein the reactor comprises a fuel core which contains a plurality of elongated elements in a lattice structure with the elements being divided interstitially according to a given lattice pattern into those containing a relatively fixed amount of moderating material and those containing fissile fuel.

It is also an object of the invention to provide a novel and efficient nuclear reactor as characterized in the preceding object wherein intermixed light and heavy water form a moderator-coolant fluid for the fuel core.

These and other objects of the invention will become more apparent upon consideration of the following detailed description along with the attached drawings, in which.

Figure 1:
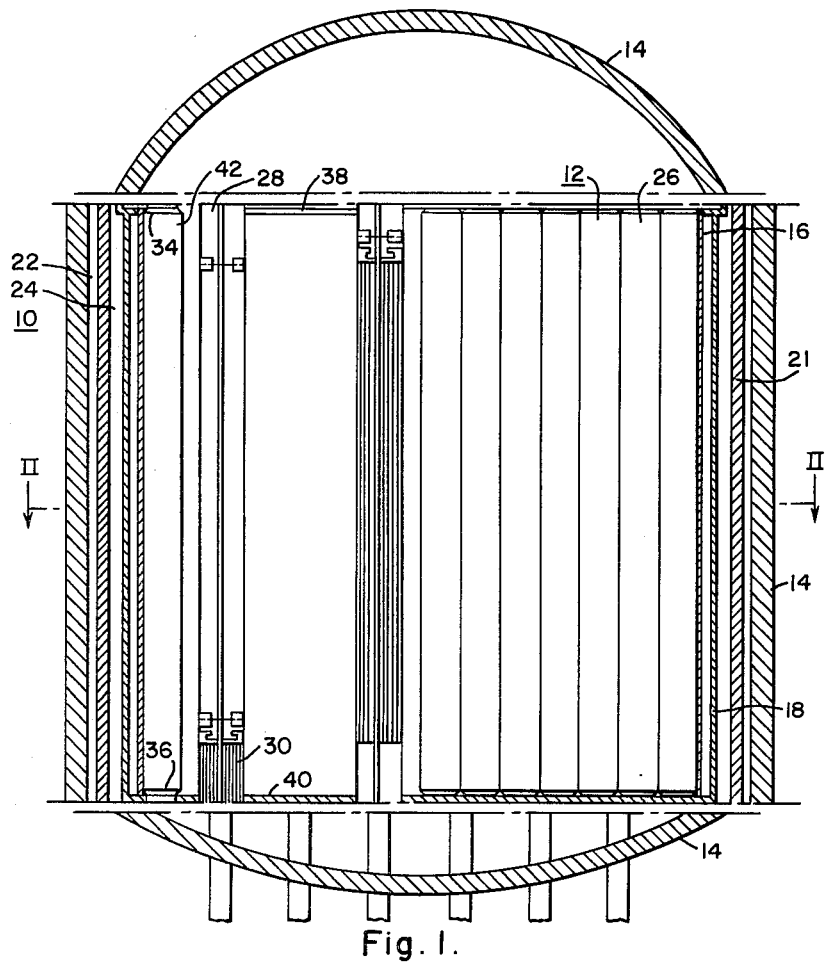
FIGURE 1 is a vertical sectional view of a portion of a nuclear reactor constructed in accordance with the principles of the invention.

More specifically, in FIG. 1, there is shown a nuclear reactor 10 constructed in accordance with the principles of the invention and provided with a fissile fuel core 12 supported within a metallic pressure vessel 14. In this case, fluid in the form of (light or mixed light and heavy) water is circulated through the fuel core 12 by suitable means as a moderating and cooling fluid, and further is subjected to boiling (through control of the circulating means) as it rises through the fuel core 12 to produce steam. The rising steam and any liquid water are separated by suitable means (not shown) disposed within the pressure vessel 14 and above the fuel core 12, and the steam is then utilized as a working fluid (for example, to drive a turbine) and the liquid water is recirculated through the fuel core 12.

Figure 2:
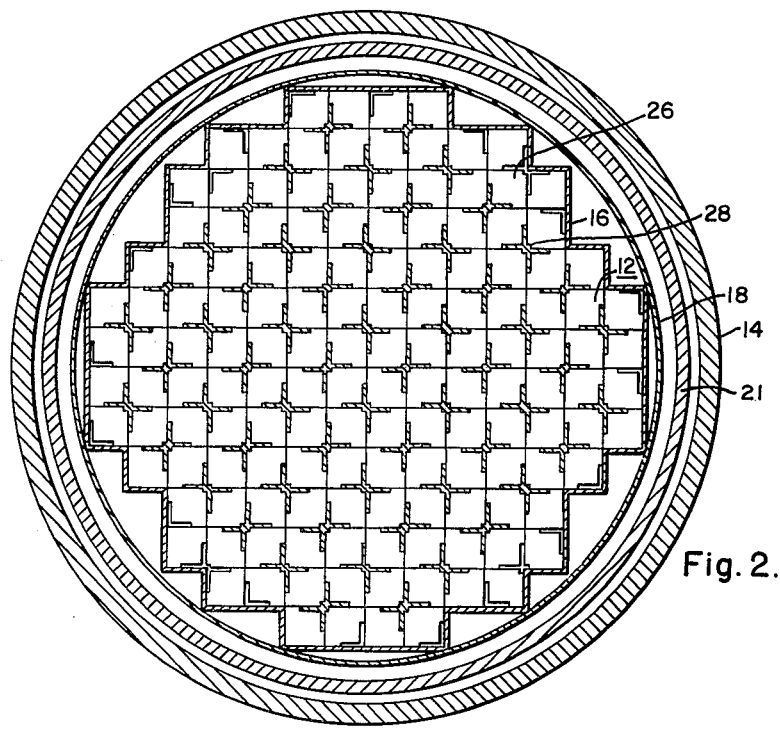
FIG. 2 shows a cross section of the nuclear reactor of FIG. 1 taken along the reference line II—II thereof.
Figure 3:
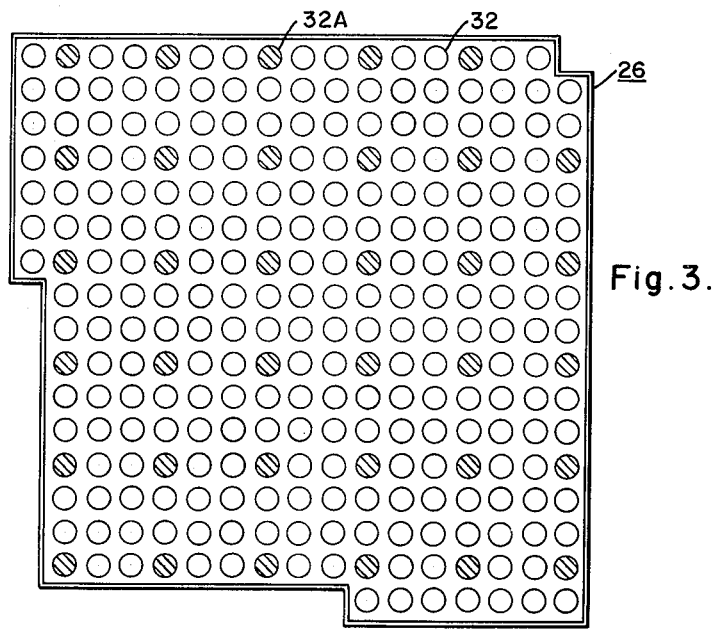
FIG. 3 shows an enlarged cross section of one of the fuel subassemblies in the nuclear reactor of FIGS. 1 and 2.

It is further noted generally that the fuel core 12 can, if desired, be contained in a core cage 16 (best observed in FIG. 2) and is supported by suitable means such as a core barrel 18 which in turn is supported on a lower core support plate or the like (not shown). The latter plate is supported on a flange (not shown) projecting radially inwardly from the pressure vessel 14. Further, a thermal neutron shield 21 of barrel shape is also supported on the latter flange in this mechanical arrangement, and annular chambers 22 and 24 are preferably provided for at least nominal coolant circulation between the pressure vessel 14, the thermal shield 21 and the core barrel 18. With use of the described or a similar supporting scheme, the fuel core 12 is substantially held in place and through the use of the thermal shield (formed from a material such as stainless steel) nucleonic heating of the pressure vessel 14 is limited.

The fuel core 12 is provided with a critical geometry and inventory of fissile fuel, that is, the geometry and amount of fissile fuel is such as to sustain a chain nuclear reaction in accordance with theory now widely published. By fissile it is meant that the fuel material is inclusive of either fertile or fissionable or both and by fertile it is meant that the material is subject to transformation into a fissionable material. Structurally, the fuel core 12 comprises a given number of elongated fuel subassemblies 26 which can have a rectanguloid or other contour and a plurality of cruciform or other shaped neutron absorbing control rods 28 which are suitably disposed for movement along various adjacent fuel subassemblies 26 in controlling the rate of neutronic reactivity. If desired, each control rod 28 can be provided with a fuel follower 30 (that is, an attached structural element containing fissile fuel) adjacent its trailing end (in this case the lower end) so as to reduce neutron flux peaking otherwise occasioned by the presence of moderator material in the space vacated by control rod withdrawal. Other reactivity control means such as movable reflectors can be employed in some applications if desired.

Each fuel subassembly 26 comprises a plurality of elongated rod-like or other shaped elements 32 arranged in a lattice structure by suitable supporting means. By lattice structure it is meant that the rods 32 are mechanically held in a generally uniform and orderly arrangement. Thus, as one example, the rods 32 can extend longitudinally between opposed end supporting plates 34 and 36 of the subassembly 26 which in turn are respectively supported by an upper core support plate 38 and a lower core support portion 40 of the core barrel 18. The end supporting plates 34 and 36 are supported in spaced relation by means of a frame structure 42 and grid-like members (not shown) secured to the frame structure 42 at various intervals along the length of the latter so as to limit the lateral displacement of the rods 32. For a more specific description of this exemplary arrangement for supporting the rods 32, reference is made to Serial No. 19,851, filed by E. Frisch on April 4, 1960, entitled "Fuel Arrangement for a Nuclear Reactor" and assigned to the present assignee, now abandoned.

Figure 4:
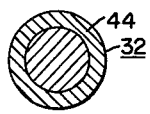
FIG. 4 shows an enlarged cross section of an elongated element used in the subassembly of FIG. 3.

As observed in FIG. 4, each of the elements or rods 32 is provided with an elongated tubular or other shaped cladding member 44, formed from stainless steel, an alloy of zirconium, or other neutron-econimizing, structural and corrosion resistant material. End plugs (not shown) are welded or otherwise secured to the ends of each cladding member 44 so as to seal fissile fuel (such as pellets of enriched uranium dioxide) or liquid or solid moderator material (such as zirconium hydride) in the various rods 32. Conventionally, each of the rods 32 would contain fissile fuel, but in this case in accordance with the principles of the invention, elements or rods 32A distributed interstitially within each subassembly 26 according to a given lattice pattern contain moderator material in solid or liquid form. For example, one such pattern as shown can be that the moderator rods 32A constitute every fourth element 32 of the lattice structure in the subassembly 26. In this manner, if by way of example the moderator rods 32A contain zirconium hydride, which can have a moderating hydrogen atom density comparable to that of water, coolant-moderator to fuel volume ratio or water-to-fuel volume ratio can be decreased (by suitable lattice tightening) for a given reactivity specification without any lowering of the moderator to fuel ratio. It is preferable that the moderator rods 32A be identically sized with the remaining fuel rods 32, but the relative sizing and shape can be different where it is desirable to provide added reactivity design flexibility if resulting neutron flux or coolant flow distortion is not then too prohibitive.

Accordingly, considerable reactivity design flexibility is provided through the use of the invention since desired heat transfer and hydraulic properties can be obtained by varying the coolant-moderator or water-to-fuel ratio without interfering to any great degree with the total moderator-to-fuel ratio. Preferred reactivity and coolant properties or parameters which are normally conflicting can therefore be provided. In addition, if the nuclear reactor 10 is a pressurized water reactor or the like, the negative coefficient of reactivity caused by the differential between start-up and operational temperature can be reduced considerably in the minimum value thereof, which is required by safety considerations, by varying the amount of fixed moderation provided by the moderator rods 32A. In the case of a boiling water reactor, which is illustrated here, the positive pressure coefficient of reactivity caused by a decrease in steam demand can be decreased substantially by selection of the number and the pattern of the moderator rods 32A, since total moderation is not then so dependent on variation in density of the coolant water or steam. Furthermore, the improved operating effects achieved through the use of the invention are not offset by undue neutron flux peaking as is usually the case where fixed amounts of moderation are provided in bulk locations rather than interstitially distributed locations as provided here.

If desired, the moderator material in the moderator rods 32A can be fluid, such as an organic liquid, and if this is the case, even may form a separate fluid system (not shown). In such a case, the moderator fluid (preferably having moderating properties relatively independent of usual temperature variations) is periodically or continuously circulated from the moderator rods 32A through conduits (not shown) attached thereto to a radioactive disposal unit where the moderator material is treated and then returned to the moderator rods 32A.

Where the nuclear reactor 10 is either a boiling water reactor or a pressurized water reactor, the reactivity and moderating effects achieved with the present invention can also be controlled separately or supplementally by providing the coolant-moderator water in the form of a mixture of ordinary or light water and deuterium oxide (heavy water) in accordance with a given proportion. This is because deuterium oxide has substantially less moderating effect on fission neutrons than does ordinary water by reason of its heavier atomic structure and therefore decreases even further the portion of total moderation provided by the coolant-moderator.

The foregoing description has been set forth only to point out the principles of the invention. Accordingly, it is desired that the invention be not limited by the embodiments set forth, but, rather, that it be accorded an interpretation consistent with the scope and spirit of its broad principles.

What is claimed is:

1. A pressurized liquid nuclear reactor comprising a suitably supported fissile fuel core said core comprising, a plurality of elongated fuel subassemblies, each of said subassemblies further comprising a plurality of elongated clad elements and means for supporting the same in a lattice structure, some of said elemens distributed interstitially throughout said subassembly according to a given pattern and containing only moderator material and the remaining elements containing only fissile material, a quantity of coolant-moderator liquid, means for circulating said liquid longitudinally through said core and said fuel assemblies, and control rods disposed in said core for controlling the rate of nuclear reactivity.

2. The combination of claim 1 wherein the distribution of said some elements is uniform throughout said subassembly, and each of said elements has a uniform cross section over substantially its entire length.

3. The combination of claim 1 wherein each of said elements is interchangeable with every other element.

4. The combination of claim 3 wherein said coolant-moderator liquid is a mixture of light water and deuterium oxide, and each of said elements are tubularly shaped.

5. The combination of claim 1 wherein said moderator material in said some elements is zirconium hydride, and said some elements are uniformly distributed throughout the cross sectional area of said subassembly.

References Cited by the Examiner

UNITED STATES PATENTS

| | | | |
|---|---|---|---|
| 2,936,273 | 5/1960 | Untermyer | 60—108 |
| 2,998,367 | 8/1961 | Untermyer | 176—54 |
| 2,999,059 | 9/1961 | Treshow | 176—54 |
| 3,049,487 | 8/1962 | Harrer et al. | 176—54 |
| 3,072,549 | 1/1963 | Koutz et al. | 176—15 |
| 3,081,246 | 3/1963 | Edlund | 176—18 |

FOREIGN PATENTS

| | | |
|---|---|---|
| 822,790 | 10/1959 | Great Brtain. |
| 873,594 | 7/1961 | Great Britain. |

OTHER REFERENCES

GA-1532, Maritime Gas-Cooled Reactor Program, June 30, 1960, FIG. 1.17.

Kruzhilin: Proceedings of the International Conference on the Peaceful Uses of Atomic Energy, volume 2, 1955, pages 435–455.

LEON D. ROSDOL, *Primary Examiner.*

CARL D. QUARFORTH, REUBEN EPSTEIN,
*Examiners.*

R. C. LYNE, L. D. RUTLEDGE, *Assistant Examiners.*